UNITED STATES PATENT OFFICE.

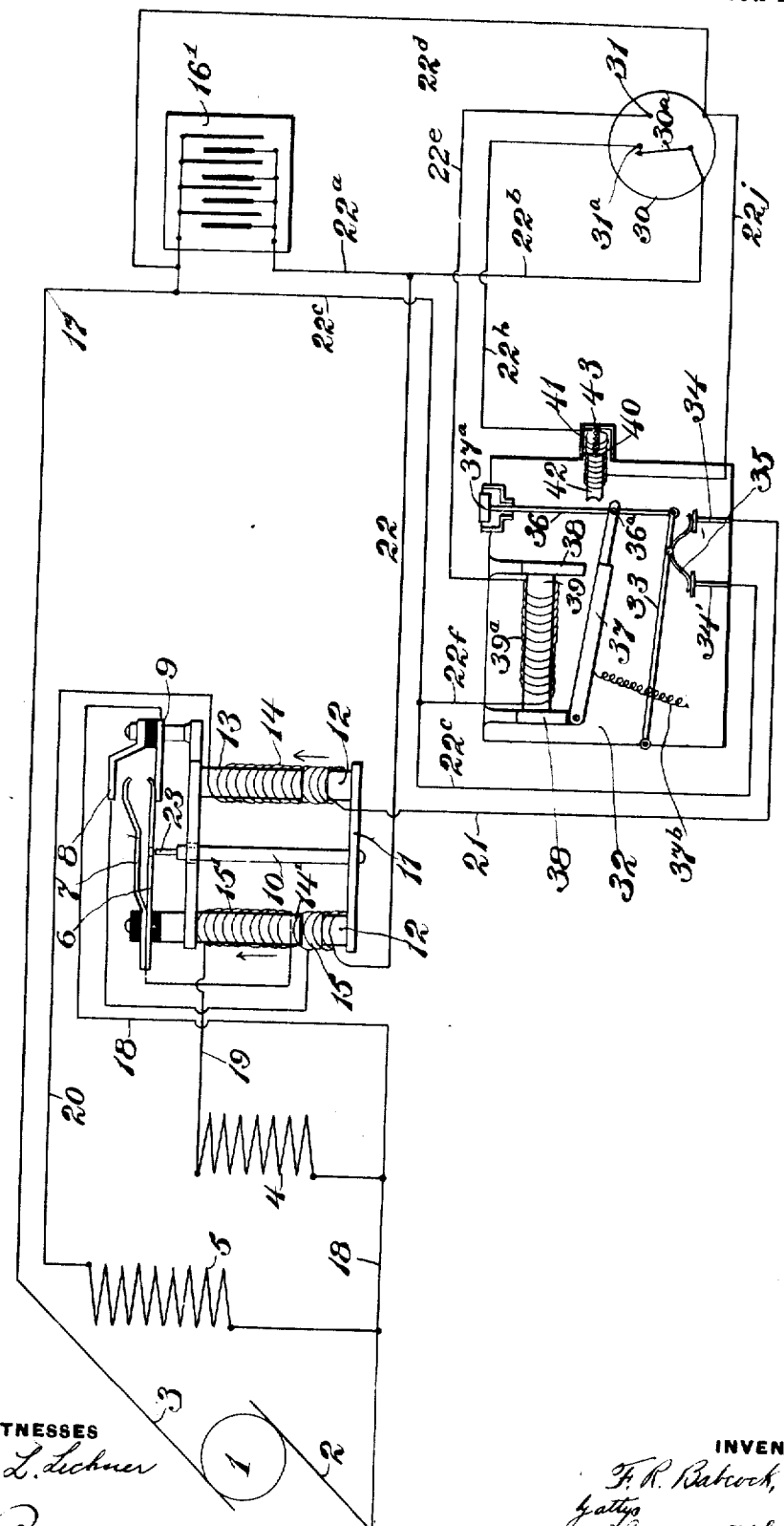

FRED RIPLEY BABCOCK, OF CHICAGO, ILLINOIS.

ELECTRIC-GENERATION SYSTEM.

No. 902,851.　　　　Specification of Letters Patent.　　　　Patented Nov. 3, 1908.

Application filed March 23, 1907. Serial No. 364,135.

*To all whom it may concern:*

Be it known that I, FRED R. BABCOCK, a citizen of the United States, residing at Chicago, in the county of Cook and State of Illinois, have invented certain new and useful Improvements in Electric-Generation Systems, of which the following is a specification.

My invention relates to electric generation systems, and particularly to those used in connection with secondary batteries, wherein it is desirable to maintain a constant voltage and charge in the battery. The invention has for its objects: to provide an arrangement wherein any danger of overcharging the battery is avoided; to provide an arrangement wherein all opportunity for the short-circuiting of the dynamo at any stage of the operation is done away with; to provide an arrangement wherein the discharge of the battery into the dynamo is at all times prevented; to provide an arrangement wherein a drop in the dynamo voltage below the battery voltage will open the electrical circuit; to provide an arrangement wherein a rise in the line voltage above a desired battery voltage will open the electrical circuit; to provide an arrangement wherein a rise in the line voltage will automatically throw into the electrical circuit means for weakening the field and reducing the flow of current from the dynamo; to provide an arrangement wherein a drop in battery voltage below a predetermined point will close the electrical circuit; to provide an arrangement wherein the charging of a battery by a dynamo is automatically governed by the variation in voltage of either the dynamo or the battery; and finally to provide a simple and economical system which may be arranged in compact form and which will combine maximum efficiency with positiveness of operation. One form of the system is shown in the accompanying drawing wherein—

The figure is a diagrammatic showing of the system.

The system is believed to have a wide application but is especially designed for use with automobiles for lighting and sparking purposes, wherein the speed of the driving motor is not constant, and it is necessary to use a secondary battery in connection with a dynamo in order to provide the proper constancy and uniformity in current. The dynamo will ordinarily be driven from the motor of the vehicle by means of a belt or chain, but if desired may be driven by an individual motor separate from the driving mechanism of the vehicle.

Referring to the diagrammatic drawing, 1 is the dynamo which, as above stated, may be driven from any desired motor and is provided with the terminals 2 and 3, 4 and 5 are the field coils, of which 4 is the series coil, and 5 is a shunt coil, 6 and 7 are leaf-springs constituting a switch, 8 and 9 are contact members with which the leaf springs 6 and 7 are adapted to contact, 10 is an operating rod for moving the springs 6 and 7, which rod is secured at its rear end to the armature bar 11 provided with the inwardly projecting ends 12, 13 and 14' are magnet bars surrounded by the operating windings 14, 15, and 15', and 16' is the secondary battery. 30 is a volt-meter having an indicating hand 30ª and contact members 31 and 31ª, 32 is an automatic switch, wherein 35 is a contact member for connecting the contact members 34 and 34' which constitute a switch, 33 is a carrying rod for the contact member 35, which rod is secured at one end to an operating rod 36 for moving the said contact member 35. The rod 36 has pivoted to it an armature bar 37 and carries a push button 37ª. The armature bar 37, normally held open by the spring 37ᵇ is pivoted to the other end to one of the projecting ends 38 on the magnet bar 39, which is surrounded by the operating winding 39ª. 40 is a solenoid, wherein 41 is the operating winding, and 42 is the armature adapted to engage with the end rod 36ª, of the magnet bar 37. 43 is a spring provided to press the armature 42 against the end 36ª and maintain the armature 37 in raised position against the opposing tendency of the spring 37ᵇ. One of the terminals of the dynamo has a direct connection 17 to a battery terminal, while the other terminal of the dynamo has direct connection with the contact member 9 by means of the wire 18. The series winding 4 has a connection at one end to the dynamo terminal 2 and at the other end is connected by means of the wire 19 with the coil 15'. The other end of the coil 15' is connected with the springs 6 and 7. The shunt winding 5 is connected at one end adjacent the terminal 2 and at the other end is connected to the coil 14 by means of the wire 20. The other end of the coil 14 is connected to the wire 17 by means of the parts 21-34-35-34'-

22ᶜ. The coil 15 is secured at one of its ends to the contact member 8 and at its other end to the terminal of the battery by means of the wires 22 and 22ᵃ. The leaf spring 6 is perforated for the passage of the reduced end 23 of the operating rod 10. In operation, when the rod 10 is raised, the reduced end 23 passes through the opening in the spring 6 and presses the spring 7 against the contact member 8 before the larger portion of the rod 10 engages the spring 6 and presses it away from its contact with the member 9. The winding of the coils 14, 15 and 15′ is in such a direction that when the current is passing through the windings in the direction indicated by the arrows, the tendency of the coils 14, 15, and 15′ will be to overcome the gravity of the armature bar 11 and raise it. The volt-meter 30 has a connection with the battery by means of the wire 22ᵃ and 22ᵇ; with the dynamo terminal 3 by means of the parts 22ᵃ, 22ᵇ, 16′ and 17; with the opposite pole of the battery by means of the wire 22ᵈ; with the winding 39ᵃ by means of the wire 22ᵉ leading from the contact member 31, and with the winding 41 by means of the wire 22ʰ leading from the contact member 31ᵃ. The other end of the winding 41 is connected to the battery by means of the wires 22ʲ and 22ᵈ. The other end of the winding 39ᵃ is connected to the battery 16′ by means of the wires 22ᶠ and 22ᶜ. In operation, when the bar 37 is raised, the contact member 35 is lifted and the electrical connection between the contact members 34 and 34′ is broken. The tendency of the coil 39ᵃ when current is passed therethrough, will be to overcome the action of the spring 37ᵇ and the gravity of the armature bar 37 and raise the said bar. The winding of the coil 41 is in such a direction that when the current is passing therethrough, the tendency of the coil will be to overcome the action of the spring 43, and permit the armature bar 37 to be drawn downward by means of the action of the spring 37ᵇ and gravity.

The operation of the device is as follows: Assuming that the leaf springs 6 and 7, and the contact members 34′, 35 and 34, are in the positions shown in the figure, and that the battery 16′ is discharged below its normal working voltage, the driving motor being started, current generated by the dynamo will flow through the parts 17, 22ᶜ, 34′, 35, 34, 21, 14, 20, 5 and 18 to the terminal 2, thereby building up the dynamo field 5, and also energizing the magnet bar 13, which raises the armature bar 11 and lifts the operating rod 10, by means of which contact is made by the spring 7, and the contact member 8. This operation of the switch permits the current to flow through the parts 17, 16′, 22ᵃ, 22, 15, 8, 7, 6, 9 and 18 to the dynamo terminal 2 thereby beginning the charge of the battery. As the voltage increases owing to the rise in speed of the dynamo and the building up of the field 5, the armature 11 is further raised, disengaging the spring 6 from the contact member 9. This shifting of the switch changes the current from the wire 18 to the wire 19 through coil 15′ thereby increasing the pull on the armature bar 11, and causes the current to flow through the series coil 4 which is wound to oppose the shunt coil 5, and reducing the flow of the current. The current will continue its flow through the parts 17, 16′, 22ᵃ, 22, 15, 8, 7, 15′, 19, 4, and 18 to the dynamo terminal 2 until the rise in voltage is sufficient to cause the indicator 30ᵃ of the volt-meter 30 to contact with the contact member 31 and permit current to flow from the wire 17 through the lines 22ᶜ and 22ᶠ, the winding 39ᵃ, line 22ᵉ, parts 31 and 30ᵃ, and line 22ᵇ to the return wire 22. This flow of current will energize the magnet bar 39, raising the armature bar 37 and lifting the operating rod 36 and thence the contact rod 33 by means of which contact is made by the contact members 34′, 35, and 34. This operation will interrupt the circuit from the dynamo terminal 3 through the parts 17, 22ᶜ, 34′, 35, 34, 21, 14, 20, 5 and 18 and return to the dynamo terminal 2. Whereupon the armature bar 11 and connected parts will drop by gravity and allow the spring 7 to disengage from the contact member 8. This operation in turn will break the circuit from the dynamo terminal 3 through the parts 17, 16′, 22ᵃ, 22, 15, 8, 7, 6, 9 and 18 and return to the dynamo terminal 2. The fields of the dynamo will now be cut out of circuit and the armature of the dynamo will merely turn over without the generation of current, and all possibility of short circuiting of the dynamo will be removed. The several dynamo circuits will now be interrupted, and a battery circuit established through the parts 16′, 22ᶜ, 22ᶠ, 39ᵃ, 22ᵉ, 31, 30ᵃ, 22ᵇ, 22ᵃ and return to the opposite pole of the battery. This battery circuit will continue as long as the battery voltage is sufficient to maintain contact of the indicator 30ᵃ, with the contact member 31. When, however, the battery voltage falls below this point and allows the indicator 30ᵃ to disengage itself from the contact member 31, the flow of the current from the battery 16′ through the parts 22ᶜ, 22ᶠ, 39ᵃ, 22ᵉ, 31, 30ᵃ, 22ᵇ, 22ᵃ and return to the opposite pole of the battery will be interrupted. The armature bar 37 and connected parts will be maintained in this open or lifted position by means of the action of spring 43 pressing against the armature 42. This will continue until the voltage of the battery drops to such a point as will cause the indicator 30ᵃ to engage with the contact 31ᵃ and permit current to flow from the battery through the parts 22ᵈ, 22ʲ, 41, 22ʰ, 31ᵃ, 30ᵃ, 22ᵇ, 22ᵃ and return to the battery.

This flow of current will energize the winding 41 and thereby cause the armature bar 42 to overcome the action of the spring 43 and disengage itself from the end 36ᵃ of the armature bar 37. Whereupon, the armature bar 37 and connected parts will be drawn downward by gravity and by the action of the spring 37ᵇ. This will reëstablish contact between the contact members 34', 35, and 34 and the process of charging the battery will be repeated.

It will thus be seen that both coils 4 and 5, wound to oppose each other, are thrown into the circuit as the battery 16' approaches a full charge, and that the dynamo current passing through the battery 16' is thereby reduced to a minimum until the automatic switch 32 opens, or the battery 16' has been discharged below its normal working voltage in the performance of its function at which time the parts will resume the position shown in the drawing and the several operations will be repeated as before. It will be further seen from the foregoing that the apparatus acts automatically, and not only prevents any overcharging of the battery, but also prevents any discharge from the battery into the dynamo.

The division of the series winding on the magnetic switch into two parts 15 and 15', is designed to prevent the hunting or vibration of the moving member 11 and the parts controlled thereby, which would be likely to result from the introduction of the series field into the circuit and consequent reduction of the current flowing between the dynamo and battery through the coil 15. By this device the magnetic pull on the switch is increased when the field of the dynamo is weakened.

The forms of cut-offs shown, are conventional ones and it will be apparent to those familiar with the art that other forms of cut-off mechanism might be substituted in the combinations without changing the invention.

Other changes which will be apparent to those skilled in the art, are comprehended by my invention and intended to be covered by the claims.

Having thus described my invention and illustrated its use, what I claim as new and desire to secure by Letters Patent is the following:

1. The combination with a shunt and series wound dynamo, of a secondary battery in the series circuit, automatic cut off means adapted to open the shunt circuit when the voltage rises above a predetermined point, and an automatic cut off controlling the series circuit and governed by the current in the shunt circuit and adapted to open such series circuit when the shunt circuit is opened.

2. The combination with a shunt and series wound dynamo, of a secondary battery in the series circuit, automatic cut off means adapted to open the shunt circuit when the voltage rises above a predetermined point, an automatic cut off controlling the series circuit and governed by the current in the shunt circuit and adapted to open such series circuit when the shunt circuit is opened, and automatic means controlled by the battery for securing the operation of the said cut off means to close the shunt circuit when the voltage falls below a predetermined point.

3. The combination with a shunt and series wound dynamo, of a secondary battery in the series circuit, automatic cut off means adapted to open the shunt circuit when the voltage rises above a predetermined point, and an automatic cut off controlling the series circuit and governed by the current in the shunt circuit and adapted to open such series circuit when the shunt circuit is opened and close it again when the shunt circuit is closed.

4. The combination with a shunt and series wound dynamo, of a secondary battery in the series circuit, automatic cut off means adapted to open the shunt circuit when the voltage rises above a predetermined point, an automatic cut off controlling the series circuit and governed by the current in the shunt circuit and adapted to open such series circuit when the shunt circuit is opened and close it again when the shunt circuit is closed, and automatic means controlled by the battery for securing the operation of the said cut off means to close the shunt circuit when the voltage falls below a predetermined point.

5. The combination with a shunt and series wound dynamo, of a secondary battery in the series circuit, cut off means in the shunt circuit, a second shunt circuit carrying electro magnetic means for operating the cut off means, automatic means for closing the second shunt circuit when the voltage rises above a predetermined point whereby the shunt circuit is opened, and an automatic cut off governed by the current in the shunt circuit controlling the series circuit and adapted to open such series when the shunt circuit is opened.

6. The combination with a shunt and series wound dynamo, of a secondary battery in the series circuit, cut off means in the shunt circuit, a second shunt circuit carrying electro magnatic means for operating the cut off means, automatic means for closing the second shunt circuit when the voltage rises above a predetermined point whereby the shunt circuit is opened, and an automatic cut off governed by the current in the shunt circuit controlling the series circuit and adapted to open such series circuit when the shunt circuit is opened and close it when the shunt circuit is closed.

7. The combination with a shunt and series wound dynamo, of a secondary battery in the series circuit, cut off means in the shunt circuit, a second shunt circuit carrying electro magnetic means for operating the cut off means, automatic means for closing the second shunt circuit when the voltage rises above a predetermined point whereby the shunt circuit is opened, a catch for holding the cut off means open, electro magnetic means controlled from the battery and adapted to be operated to release the cut off means when the voltage drops below a predetermined point, and an automatic cut off governed by the current in the shunt circuit controlling the series circuit and adapted to open such series when the shunt circuit is opened.

8. The combination with a shunt and series wound dynamo, of a secondary battery in the series circuit, a second shunt circuit for cutting out the series winding, and an automatic switch device lying in the series circuit and second shunt circuit and governed by an operating winding lying in the shunt circuit, the said switch device normally maintaining the said series and second shunt circuit open, and adapted on an increase of voltage in the shunt circuit to first close the second shunt circuit and then on a further increase to open such circuit and close the series circuit.

9. The combination with a shunt and series wound dynamo, of a secondary battery in the series circuit, a second shunt circuit for cutting out the series winding, and an automatic switch device lying in the series circuit and second shunt circuit and governed by an operating winding lying in the shunt circuit, the said switch device normally maintaining the said series and second shunt circuit open, and adapted on an increase of voltage in the shunt circuit to first close the second shunt circuit and then on a further increase to open such circuit and close the series circuit, and a second operating winding circuit for assisting in the movement of the switch device.

10. The combination with a shunt and series wound dynamo of a secondary battery in the series circuit, a second shunt circuit for cutting out the series winding, and an automatic switch device lying in the series circuit and a second shunt circuit and governed by an operating winding lying in the shunt circuit, the said switch device normally maintaining the said series and second shunt circuit open, and adapted on an increase of voltage in the shunt circuit to first close the second shunt circuit and then on a further increase to open such circuit and close the series circuit, and a second operating winding in the series circuit arranged in two sections and connected to the switch device so as to be successively brought into the circuit as the second shunt and series circuit are closed.

In testimony whereof, I have hereunto signed my name in the presence of the two subscribing witnesses.

FRED RIPLEY BABCOCK.

Witnesses:
A. S. McKEE,
PAUL CARPENTER.